United States Patent
Honda et al.

(10) Patent No.: US 12,282,248 B2
(45) Date of Patent: Apr. 22, 2025

(54) FLUORESCENT LIGHT-EMITTING MODULE, PROJECTOR, AND PHOSPHOR WHEEL

(71) Applicant: Panasonic Intellectual Property Management Co., Ltd., Osaka (JP)

(72) Inventors: Yosuke Honda, Nara (JP); Yoshiyuki Takahira, Kyoto (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 18/566,840

(22) PCT Filed: May 26, 2022

(86) PCT No.: PCT/JP2022/021514
§ 371 (c)(1),
(2) Date: Dec. 4, 2023

(87) PCT Pub. No.: WO2023/276502
PCT Pub. Date: Jan. 5, 2023

(65) Prior Publication Data
US 2024/0272534 A1    Aug. 15, 2024

(30) Foreign Application Priority Data

Jun. 29, 2021  (JP) ................. 2021-107487

(51) Int. Cl.
G03B 21/20    (2006.01)
G02B 26/00    (2006.01)

(52) U.S. Cl.
CPC ......... *G03B 21/204* (2013.01); *G02B 26/008* (2013.01)

(58) Field of Classification Search
CPC ...... G03B 21/204; G03B 21/00; G03B 21/14; G03B 33/08; G02B 26/008; H04N 9/31
See application file for complete search history.

(56) References Cited

U.S. PATENT DOCUMENTS

| | | |
|---|---|---|
| 2014/0254130 A1 | 9/2014 | Mehl |
| 2018/0095353 A1 | 4/2018 | Ishikawa |

(Continued)

FOREIGN PATENT DOCUMENTS

| | | |
|---|---|---|
| JP | 2014-170749 | 9/2014 |
| JP | 2015-118139 | 6/2015 |

(Continued)

OTHER PUBLICATIONS

Nitta et al., "High-Brightness Red-Emitting Phosphor $La_3(Si,Al)_6(O,N)_{11}:Ce^{3+}$ for Next-Generation Solid-State Light Sources", ACS Applied Materials & Interfaces, Dec. 28, 2020, pp. 31652-31658.

(Continued)

*Primary Examiner* — Anne M Hines
*Assistant Examiner* — Jose M Diaz
(74) *Attorney, Agent, or Firm* — GREENBLUM & BERNSTEIN, P.L.C.

(57) ABSTRACT

A fluorescent light-emitting module includes: a light source, a phosphor wheel including yellow phosphor that emits first fluorescence when excited by excitation light emitted by the light source; a color wheel including a color filter that trims the first fluorescence to desired color light by cutting a part of the first fluorescence; a red phosphor that emits second fluorescence when excited by a part of the first fluorescence.

8 Claims, 9 Drawing Sheets

(56) References Cited

U.S. PATENT DOCUMENTS

| | | | |
|---|---|---|---|
| 2018/0149957 A1* | 5/2018 | Maeda | .............. H04N 9/3102 |
| 2019/0018309 A1 | 1/2019 | Hamamur | |
| 2019/0331991 A1 | 10/2019 | Ikeda et al. | |
| 2020/0233288 A1 | 7/2020 | Hamamur | |
| 2020/0319540 A1 | 10/2020 | Kato | |

FOREIGN PATENT DOCUMENTS

| | | | |
|---|---|---|---|
| JP | 2016-031402 | 3/2016 | |
| JP | 2016-142820 | 8/2016 | |
| JP | 2018-060042 | 4/2018 | |
| JP | 2019-152784 | 9/2019 | |
| JP | 2019-194673 | 11/2019 | |
| JP | 2020-098266 | 6/2020 | |
| JP | 7277223 B2 * | 5/2023 | ........... G03B 21/204 |
| WO | 2016/166885 | 10/2016 | |
| WO | 2018/042560 | 3/2018 | |
| WO | 2019/038862 | 2/2019 | |
| WO | 2019/093063 | 5/2019 | |
| WO | 2019/111326 | 6/2019 | |

OTHER PUBLICATIONS

International Search Report issued in International Patent Application No. PCT/JP2022/021514, dated Jul. 26, 2022, along with an English translation thereof.

* cited by examiner

FLUORESCENT LIGHT-EMITTING MODULE, PROJECTOR, AND PHOSPHOR WHEEL

TECHNICAL FIELD

The present invention relates to a fluorescent light-emitting module, a projector, and a phosphor wheel.

BACKGROUND ART

Patent Literature (PTL) 1 discloses a projection type image display device that includes a light source, a first rotating wheel, and a second rotating wheel. The first rotating wheel is provided with a plurality of segments that emit colored light in mutually different wavelength bands. The second rotating wheel is provided with a color filter segment that transmits the colored light incident from the first rotating wheel. The color filter segment includes a region that transmits red light contained in yellow light emitted from the first rotating wheel.

CITATION LIST

Patent Literature

[PTL 1]
   Japanese Unexamined Patent Application Publication No. 2016-142820

SUMMARY OF INVENTION

Technical Problem

However, in the conventional technique described above, the color filter segment transmits a part of light emitted from the first rotating wheel while not transmitting the other part of the light. This causes a problem that light utilization efficiency is low.

In view of the above, an object of the present invention is to provide a fluorescent light-emitting module, a projector, and a phosphor wheel, which have high light utilization efficiency.

Solution to Problem

A fluorescent light-emitting module according to an aspect of the present invention includes: a light source; a first rotating wheel including a first phosphor that emits first fluorescence when excited by excitation light emitted by the light source; a second rotating wheel including a color filter that trims the first fluorescence to desired color light by cutting a part of the first fluorescence; and a second phosphor that emits second fluorescence when excited by a part of the first fluorescence.

A projector according to an aspect of the present invention includes: the fluorescent light-emitting module according to the aspect described in the previous paragraph.

A phosphor wheel according to an aspect of the present invention includes: a first phosphor that emits first fluorescence when excited by excitation light emitted by a light source; and a second phosphor that is stacked on the first phosphor and emits second fluorescence when excited by a part of the first fluorescence.

Advantageous Effects of Invention

According to the present invention, it is possible to provide, for example, a fluorescent light-emitting module, a projector, a phosphor wheel, which have high light utilization efficiency.

DESCRIPTION OF EMBODIMENTS

Figure 1:
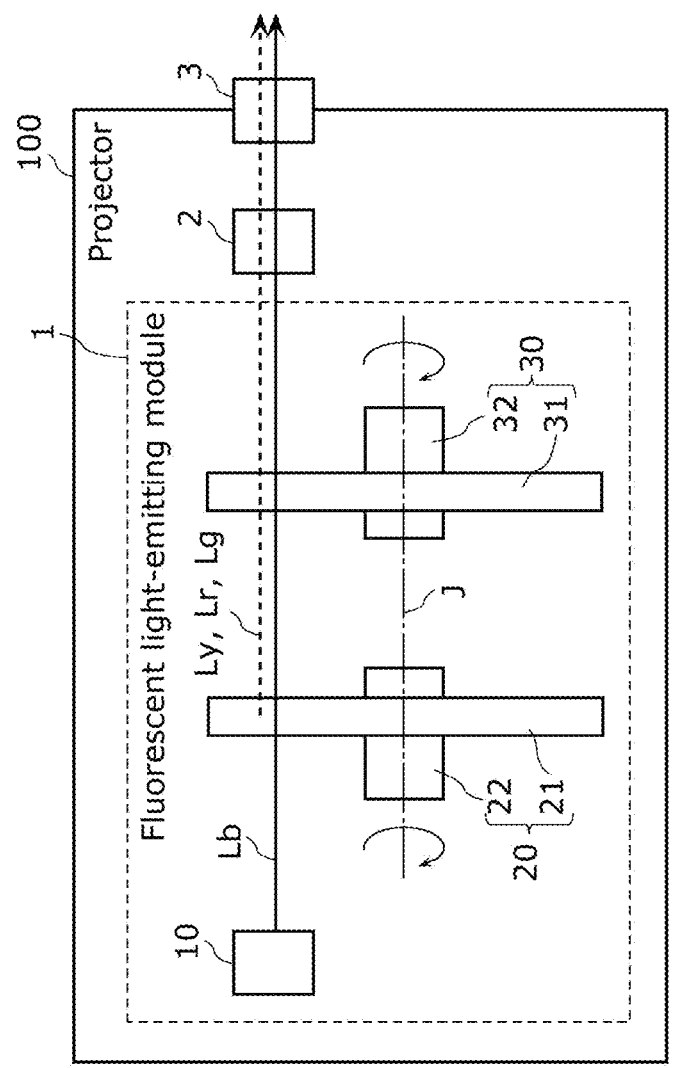
FIG. 1 is a schematic diagram showing a configuration of a projector according to an embodiment.

Hereinafter, a fluorescent light-emitting module, a projector, and a phosphor wheel, according to an embodiment of the present invention, will be described in detail with reference to the drawings. It should be noted that every embodiment described below is a specific example of the present invention. Accordingly, a numerical value, a shape, a material, a structural component, arrangement and connection forms of the components, a step, an order of steps, etc., described in the following embodiments are merely examples, and are not intended to limit the present invention. Therefore, among structure components in the following embodiments, structure components that are not recited in independent claims will be described as optional structural components.

Furthermore, each drawing is a schematic diagram and is not necessarily strictly illustrated. Accordingly, the scales and the like in each drawing do not necessarily match, for example. Furthermore, in each drawing, substantially the same configurations are denoted by the same reference numerals, and redundant explanations will be omitted or simplified.

In the present specification, terms indicating relationships between components such as orthogonal or parallel, terms indicating shapes of components such as circular, and numerical ranges are not expressions that express only strict meanings, but are expressions that indicate substantially an equivalent range that covers a difference of several percentage points, for example.

EMBODIMENTS

1. Projector

Figure 2:
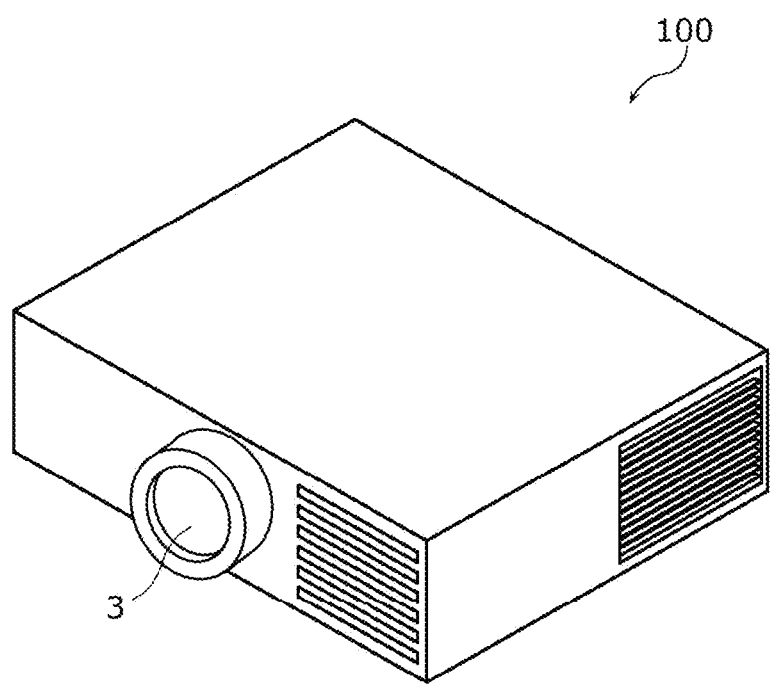
FIG. 2 is a perspective view showing appearance of the projector according to the embodiment.

First, an overview of a projector according to an embodiment will be described with reference to FIGS. 1 and 2. FIG. 1 is a schematic diagram showing projector 100 according to the present embodiment. FIG. 2 is a perspective view showing appearance of projector 100 according to the present embodiment.

As shown in FIG. 1, projector 100 includes fluorescent light-emitting module 1, display element 2, and projection optical member 3. Although it is not shown in FIG. 1, projector 100 may further include one or more optical elements such as a reflective mirror, a lens, a prism, a dichroic mirror, a polarizing element, and a rod integrator.

Fluorescent light-emitting module 1 is a light source device that emits visible light. Fluorescent light-emitting module 1 emits red light Lr, green light Lg, blue light Lb, and yellow light Ly in a time-division manner. The specific configuration of fluorescent light-emitting module 1 will be described later.

Display element 2 generates and outputs image light by using the visible light emitted by fluorescent light-emitting module 1. For example, display element 2 is a digital light processing (DLP) substrate having a digital micromirror device (DMD). Display element 2 generates the image light including a red-green-blue (RGB) color image by synchronizing four colors of light, which are time-divisionally incident from fluorescent light-emitting module 1, with turning on/off of micromirrors in the DMD. In other words, projector 100 according to the present embodiment is a so-called DLP type projector.

It should be noted that projector 100 may be a liquid crystal projector. Specifically, projector 100 may include an optical element such as a dichroic mirror that separates an optical path for each color of light. In this case, display element 2 may include a liquid crystal panel for each color of light and a prism.

Projection optical member 3 projects the image light output from display element 2 to a screen (not shown). Projection optical member 3 includes, for example, one or more projection lenses.

2. Fluorescent Light-Emitting Module

Subsequently, a specific configuration of fluorescent light-emitting module 1 will be described.

As shown in FIG. 1, fluorescent light-emitting module 1 includes light source 10, phosphor wheel 20, and color wheel 30. Although it is not shown in FIG. 1, fluorescent light-emitting module 1 may further include one or more optical elements such as a reflective mirror, a lens, a prism, a dichroic mirror, a polarizing element, a rod integrator, and the like.

[2-1. Light Source]

Light source 10 is a light source device that emits excitation light. For example, light source 10 includes a solid state light emitting element such as a semiconductor laser element or a light emitting diode (LED). As an example, light source 10 includes a plurality of semiconductor laser elements and has high output energy. Specifically, light source 10 has output energy of 10 W or more and 500 W or less.

The excitation light emitted by light source 10 has a peak wavelength in a range of 380 nm or more and 490 nm or less. For example, the semiconductor laser element included in light source 10 is a blue laser element that emits blue laser light with a peak wavelength of 445 nm. Accordingly, in the present embodiment, the excitation light is blue light Lb.

[2-2. Phosphor Wheel]

Figure 3:
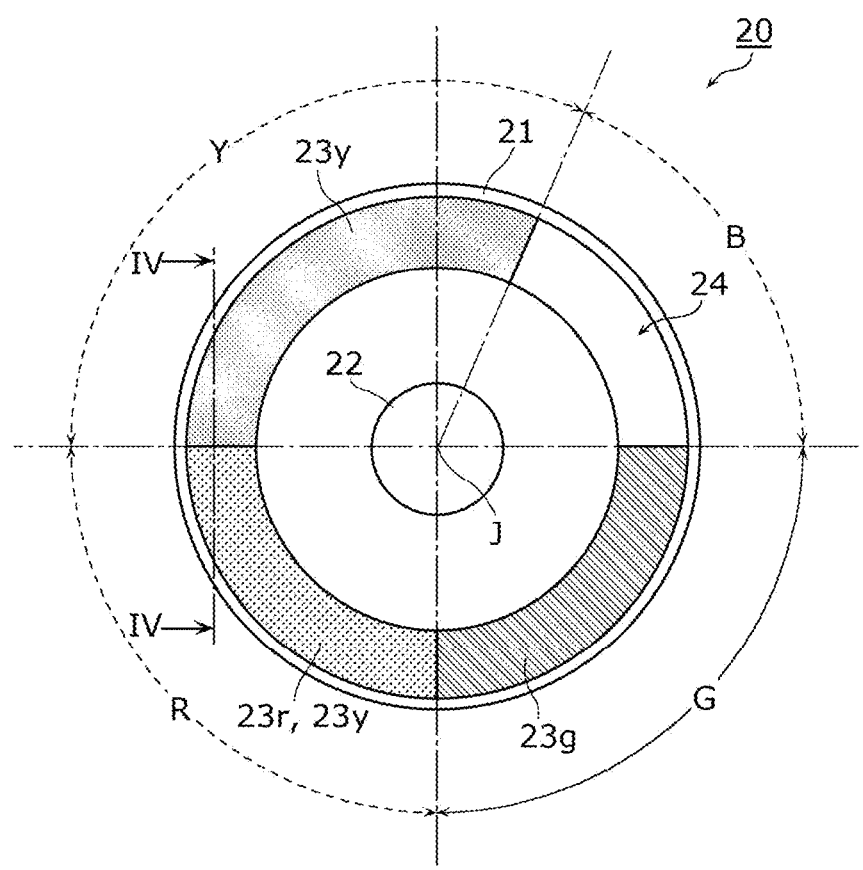
FIG. 3 is a plane view of a phosphor wheel according to the embodiment.
Figure 4:
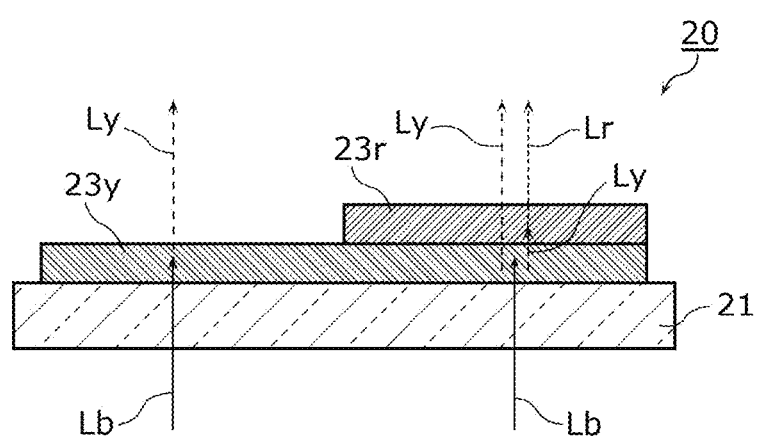
FIG. 4 is a cross-sectional view of the phosphor wheel, taken along the line IV-IV in FIG. 3.

Phosphor wheel 20 is an example of a first rotating wheel. As shown in FIG. 1, phosphor wheel 20 includes substrate 21 and motor 22. In addition, as shown in FIG. 3, phosphor wheel 20 includes yellow phosphor 23$y$, red phosphor 23$r$, green phosphor 23$g$, and transparent portion 24. Here, FIG. 3 is a plane view of phosphor wheel 20 according to the present embodiment. In addition, FIG. 4 is a cross-sectional view of phosphor wheel 20, taken along the line IV-IV in FIG. 3.

Substrate 21 has a circular shape in plane view. Motor 22 is attached to the center of substrate 21. Substrate 21 is rotated by motor 22 around rotation axis J. Motor 22 is a drive element that rotates substrate 21. Motor 22 is a direct current (DC) motor, for example, but is not particularly limited.

In the present embodiment, substrate 21 is transparent to blue light Lb that is the excitation light. Substrate 21 is, for example, sapphire, gallium nitride, a glass substrate, a quartz substrate, or the like. Alternatively, substrate 21 may be a transparent resin substrate, such as polyethylene naphthalate (PEN) and polyethylene terephthalate (PET).

Substrate 21 may be provided with a light diffusion function. Specifically, light diffusing particles may be dispersed inside substrate 21. Alternatively, a surface of substrate 21 may be provided with minute irregularities for diffusing light.

Substrate 21 is a support substrate that supports phosphor. Specifically, yellow phosphor 23$y$, red phosphor 23$r$, and green phosphor 23$g$ are arranged on a main surface of substrate 21. Furthermore, substrate 21 is provided with transparent portion 24.

Yellow phosphor 23$y$ is an example of a first phosphor that emits first fluorescence when excited by the excitation light emitted by light source 10. Yellow phosphor 23$y$ emits yellow light Ly as the first fluorescence, when excited by blue light Lb. Specifically, regarding yellow phosphor 23$y$, an excitation spectrum has a peak wavelength in the range of 380 nm or more and 490 nm or less, and a fluorescence spectrum has a peak wavelength in the range of 530 nm or more and 580 nm or less. As an example, yellow phosphor 23$y$ is a cerium-activated garnet structure phosphor and is represented by a chemical formula of $Y_3Al_5O_{12}:Ce^{3+}$, but is not limited thereto.

Red phosphor 23$r$ is an example of a second phosphor that emits second fluorescence when excited by a part of the first fluorescence. Red phosphor 23$r$ emits red light Lr as the second fluorescence when excited by yellow light Ly. Regarding red phosphor 23$r$, the excitation spectrum has a peak wavelength in the range of 500 nm or more and 580 nm or less, and the fluorescence spectrum has a peak wavelength in the range of 580 nm or more and 700 nm or less. As an example, red phosphor 23$r$ is represented by the chemical formula of $La_3(Si,Al)_6(N,O)_{11}:Ce^{3+}$.

Figure 5:
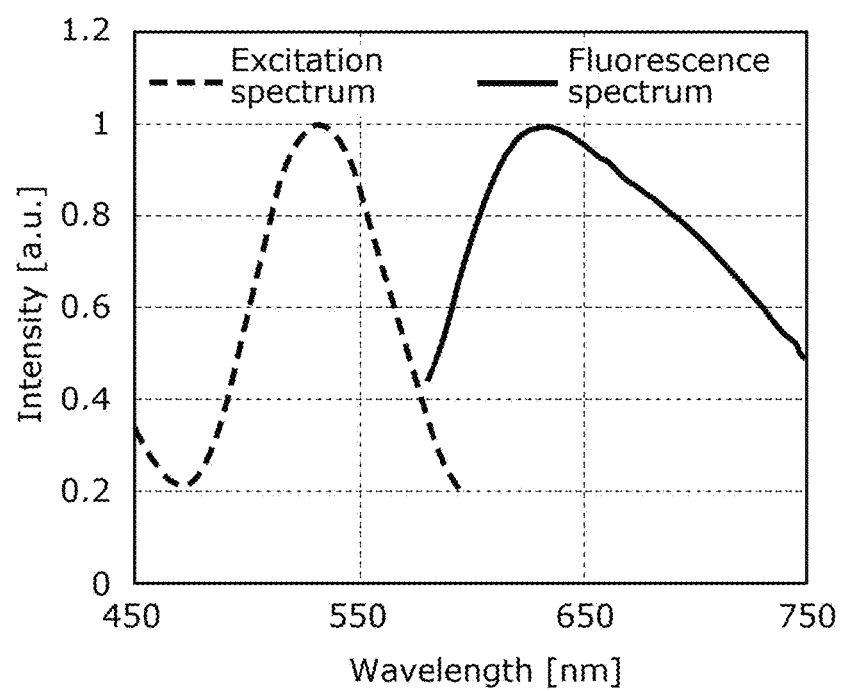
FIG. 5 is a diagram showing an excitation spectrum and a fluorescence spectrum of red phosphor included in the phosphor wheel according to the embodiment.

FIG. 5 is a diagram showing the excitation spectrum and the fluorescence spectrum of red phosphor 23$r$ included in phosphor wheel 20 according to the present embodiment. As shown in FIG. 5, the excitation spectrum has a peak wavelength at about 530 nm, and its half width is about 50 nm. The fluorescence spectrum has a peak wavelength at about 630 nm, and its half width is about 75 nm. It should be noted that "about" means a range of +20 nm.

Red phosphor 23$r$ may be any phosphor in which a peak wavelength of the excitation spectrum is included in the wavelength range of yellow light Ly and a peak wavelength of the fluorescence spectrum is included in the wavelength range of red light Lr. Red phosphor 23r is not limited to a phosphor represented by the chemical formula of $La_3(Si, Al)_6(N,O)_{11}:Ce^{3+}$.

Green phosphor 23g is an example of a third phosphor that emits third fluorescence when excited by the excitation light emitted by light source 10. Green phosphor 23g emits green light Lg as the third fluorescence, when excited by blue light Lb. Specifically, regarding green phosphor 23g, the excitation spectrum has a peak wavelength in the range of 380 nm or more and 490 nm or less, and the fluorescence spectrum has a peak wavelength in the range of 490 nm or more and 530 nm or less. As an example, green phosphor 23g is a cerium-activated garnet structure phosphor and is represented by the chemical formula of $Lu_3Al_5O_{12}:Ce^{3+}$, but is not limited thereto.

Transparent portion 24 is a portion in which none of yellow phosphor 23y, green phosphor 23g, and red phosphor 23r is provided. In other words, transparent portion 24 is a part of substrate 21 that is transparent to the excitation light. It should be noted that transparent portion 24 may be a through hole penetrating substrate 21. Alternatively, transparent portion 24 may be a transparent member that is provided in a through hole penetrating substrate 21 and has a higher transmittance for the excitation light than substrate 21 has.

In the present embodiment, phosphor wheel 20 is divided into four segments Y, R, G, and B along a circumferential direction, as shown in FIG. 3. Segment Y mainly emits yellow light Ly, when the excitation light is incident thereon. Segment R mainly emits red light Lr, when the excitation light is incident thereon. Segment G mainly emits green light Lg, when the excitation light is incident thereon. Segment B mainly emits blue light Lb, when the excitation light is incident thereon. It should be noted that the arrangement order of each segment is only an example and is not particularly limited.

Each of segment R and segment G corresponds to a quadrant having a central angle of 90 degrees. Segment Y corresponds to a fan shape having the central angle larger than 90 degrees. Segment B corresponds to a fan shape having the central angle of less than 90 degrees. The size of each segment is determined according to intensity of the emitted light. Specifically, the greater the intensity of the emitted light is, the smaller the size of the corresponding segment becomes. In this embodiment, since the intensity of blue light Lb is higher than those of other lights, the size of segment B is smaller than the other segments. Depending on an intensity ratio of the emitted light, all four segments may have the same size.

Segment B is a portion where transparent portion 24 is provided. Segment G is a portion where green phosphor 23g is provided. Segment R is a portion where both red phosphor 23r and yellow phosphor 23y are provided. Segment Y is a portion where only yellow phosphor 23y is provided among red phosphor 23r and yellow phosphor 23y.

In the present embodiment, yellow phosphor 23y and red phosphor 23r overlap in the plane view. Specifically, red phosphor 23r is stacked on a part of yellow phosphor 23y, as shown in FIG. 4. Red phosphor 23r is almost entirely superimposed on yellow phosphor 23y. In other words, segment Y is a portion where yellow phosphor 23y is provided, excluding a portion where red phosphor 23r is provided.

Yellow phosphor 23y, red phosphor 23r, green phosphor 23g, and transparent portion 24 are arranged side by side along a circumferential direction of a circle having its center on rotation axis J. Specifically, yellow phosphor 23y, red phosphor 23r, green phosphor 23g, and transparent portion 24 have a predetermined width in a radial direction, and are arranged in a donut shape in the plane view.

Phosphor wheel 20 is arranged so that the excitation light (blue light Lb) emitted from light source 10 enters a predetermined part of phosphor wheel 20. Specifically, the excitation light enters any one of segment Y, segment R, segment G, and segment B at a certain time. As phosphor wheel 20 rotates, the excitation light enters each of segment Y, segment R, segment G, and segment B in order, and corresponding light is emitted from each segment.

In the present embodiment, phosphor wheel 20 is a transmissive wheel. Specifically, the excitation light (blue light Lb) emitted from light source 10 passes through phosphor wheel 20 and color wheel 30 in this order, as shown in FIG. 1. For example, when red phosphor 23r is focused, light source 10, yellow phosphor 23y, red phosphor 23r, and color filter 33r (see FIG. 6) are arranged in this order along an optical path of the excitation light.

[2-3. Color Wheel]

Figure 6:
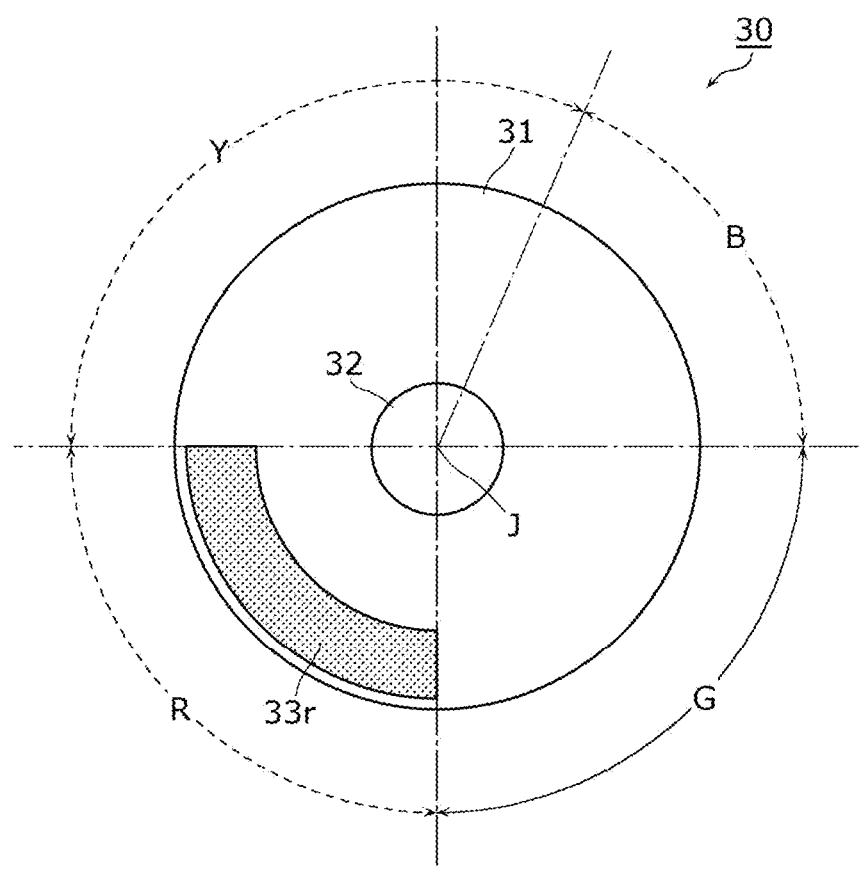
FIG. 6 is a plane view of a color wheel according to the embodiment.

Color wheel 30 is an example of a second rotating wheel. As shown in FIG. 1, color wheel 30 includes substrate 31 and motor 32. In addition, color wheel 30 includes color filter 33r, as shown in FIG. 6. Here, FIG. 6 is a plane view of color wheel 30 according to the present embodiment.

Substrate 31 has a circular shape in the plane view. Motor 32 is attached to the center of substrate 31. Substrate 31 is rotated by motor 32 around rotation axis J. Motor 32 is a drive element that rotates substrate 31. Motor 32 is a DC motor, for example, but is not particularly limited. It should be noted that color wheel 30 is rotationally controlled in synchronization with phosphor wheel 20 at a rotation speed same as that for phosphor wheel 20. Accordingly, substrate 31 of color wheel 30 and substrate 21 of phosphor wheel 20 may be rotated by one common motor.

Substrate 31 is transparent to the light emitted from phosphor wheel 20. Specifically, substrate 31 is transparent for each of blue light Lb, red light Lr, green light Lg, and yellow light Ly. Substrate 31 is, for example, a glass substrate, a quartz substrate, or the like. Alternatively, substrate 31 may be a transparent resin substrate such as PEN or PET.

Substrate 31 may be provided with a light diffusion function. Specifically, light diffusing particles may be dispersed inside substrate 31. Alternatively, a surface of substrate 31 may be provided with minute irregularities for diffusing light.

Substrate 31 is a support substrate that supports color filter 33r. Specifically, color filter 33r is provided in a part of a main surface of substrate 31.

Color filter 33r trims the first fluorescence to desired color light by cutting a part of the fluorescence. The term "cut" not only means completely removing wavelength components other than wavelength components of the desired color light, but also means reducing the intensity of wavelength components other than wavelength components of the desired color light.

Figure 7:
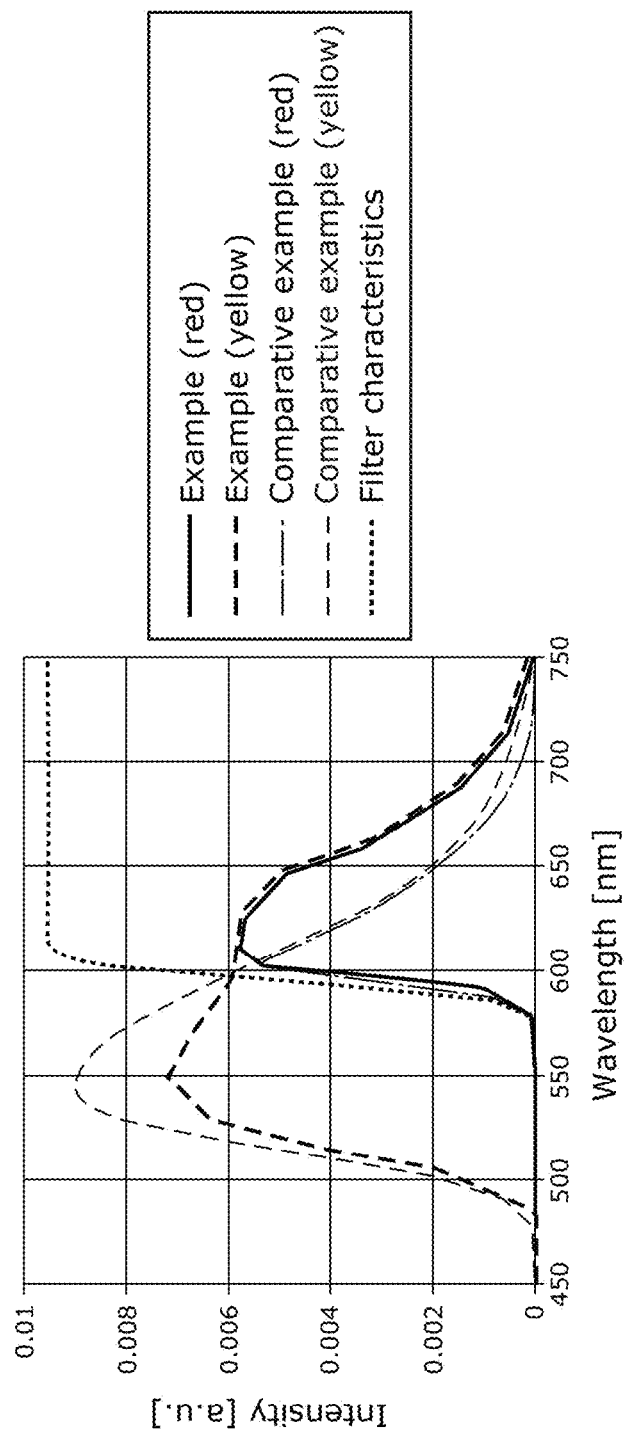
FIG. 7 is a diagram showing filter characteristics of a color filter and a spectrum of transmitted light according to the embodiment.

In the present embodiment, color filter 33r cuts a part of yellow light Ly and transmits red light Lr. In other words, color filter 33r has a transmission band in the red wavelength band. For example, color filter 33r is a high-pass filter that transmits light in a wavelength band of about 600 nm or more, as shown in FIG. 7. FIG. 7 is a diagram showing filter characteristics and a spectrum of transmitted light of color filter 33r according to the present embodiment. It should be noted that color filter 33r may be a bandpass filter. In such a case, color filter 33r has, as an example, a wavelength band of about 600 nm or more and about 780 nm or less as the transmission band.

Color filter 33r is provided at a part of color wheel 30, which corresponds to segment R of phosphor wheel 20, as shown in FIG. 6. In other words, color filter 33r allows red light Lr emitted from segment R to be transmitted. FIG. 6 illustrates correspondence with each of segments Y, B, G, and R of phosphor wheel 20. As described above, color wheel 30 and phosphor wheel 20 rotate synchronously. Therefore, light emitted from one part of phosphor wheel 20 always enters the corresponding part of color wheel 30. Specifically, red light Lr emitted from segment R substantially always passes through color filter 33r. Yellow light Ly emitted from segment Y, blue light Lb emitted from segment B, and green light Lg emitted from segment G do not pass through color filter 33r.

3. Effect and the Like

Subsequently, effects of fluorescent light-emitting module 1 according to the present embodiment will be described with reference to FIG. 7.

FIG. 7 shows the respective spectra of yellow light and red light according to comparative examples and the respective spectra of yellow light and red light according to examples. The comparative examples correspond to a configuration in which phosphor wheel 20 does not include red phosphor 23r.

In the comparative examples, red light Lr is generated by trimming a part of yellow light Ly using color filter 33r. As shown in the comparative example (yellow) in FIG. 7, yellow phosphor 23y has a peak wavelength of about 550 nm and emits yellow light Ly that has a shorter wavelength than a red component. Accordingly, intensity of the red component is not sufficient. Furthermore, since the yellow component with high intensity is removed, light utilization efficiency is low.

On the other hand, in the present embodiment, a part of yellow light Ly emitted from yellow phosphor 23y is converted into red light Lr by red phosphor 23r, as shown in FIG. 4. Therefore, in the light emitted from segment R of phosphor wheel 20, component of the peak wavelength decreases, but the red component increases, as shown in the example (yellow) shown in FIG. 7. Accordingly, when trimming is performed using color filter 33r, the intensity of red light Lr becomes high. A light component that was primarily cut (yellow light) is converted into red light, thereby increasing the light utilization efficiency.

In the comparative example, the intensity decreases toward a longer wavelength side as shown in the comparative example (red) in FIG. 7. If the transmission band is set to the longer wavelength side, it is more noticeable that the intensity of the red light is insufficient. Accordingly, in order to ensure the intensity of the red light, the transmission band should be set on a short wavelength side. However, since yellow components on the shorter wavelength side are also contained, color purity decreases.

On the other hand, in the present embodiment, the intensity of red light Lr is high. Accordingly, the transmission band of color filter 33r can be set to a longer wavelength side. Therefore, the color purity of red light Lr can be increased. The purity of each of RGB increases, thereby improving reproducibility of color in images.

Although red phosphor 23r that emits red light Lr when excited by yellow light Ly is used in this embodiment, it is conceivable to arrange, in segment R, a red phosphor that emits red light when excited by excitation light (blue light Lb). However, if the output energy of light source 10 is large, the amount of heat emitted by the red phosphor becomes too large, leading to characteristic deterioration and/or destruction of phosphor wheel 20. In view of this, as in the present embodiment, the red phosphor that uses yellow light Ly emitted by yellow phosphor 23y is used as the excitation light, thereby preventing heat from generating; improving the reliability of phosphor wheel 20; and increasing a lifespan.

As described above, fluorescent light-emitting module 1 according to the present embodiment includes light source 10, first rotating wheel including a first phosphor that emits first fluorescence when excited by excitation light emitted by light source 10, and a second rotating wheel including color filter 33r that trims the first fluorescence to desired color by cutting a part of the first fluorescence; and a second phosphor that emits a second fluorescence when excited by a part of the first fluorescence.

With this configuration, the light utilization efficiency can be increased. Furthermore, color reproducibility can also be improved. Furthermore, since heat generation can be prevented, thereby improving reliability and extending the lifespan.

For example, the first phosphor is yellow phosphor 23y that emits yellow light Ly as the first fluorescence, and second phosphor is red phosphor 23r that emits red light Lr as second fluorescence.

With this configuration, the intensity of red light Lr, which tends to be insufficient in intensity, can be increased, so that color reproducibility can be improved.

For example, red phosphor 23r is stacked on yellow phosphor 23y.

With this configuration, the incidence efficiency of yellow light Ly emitted from yellow phosphor 23y to red phosphor 23r can be increased, so that the light utilization efficiency can be further increased.

For example, color filter 33r transmits at least a part of the second fluorescence.

With this configuration, red light Lr is trimmed using color filter 33r, thereby increasing the purity of the red color.

For example, light source 10, yellow phosphor 23y, red phosphor 23r, and color filter 33r are arranged in this order along an optical path of the excitation light.

With this configuration, light source 10, phosphor wheel 20, and color wheel 30 can be arranged on the same straight line, thereby facilitating optical path design. The number of optical elements such as mirrors can be reduced, and fluorescent light-emitting module 1 can be made smaller.

For example, red phosphor 23r is represented by a chemical formula of $La_3(Si,Al)_6(N,O)_{11}$.

Accordingly, yellow light Ly can be converted into red light Lr with high efficiency.

Furthermore, projector 100 according to the present embodiment includes fluorescent light-emitting module 1.

With this configuration, the same effect as fluorescent light-emitting module 1 can be obtained.

Furthermore, phosphor wheel 20 according to the present embodiment includes a first phosphor that emits the first fluorescence when excited by the excitation light emitted by light source 10, and a second phosphor that is stacked on the first phosphor, and emits second fluorescence when excited by a part of the first phosphor.

With this configuration, the same effect as fluorescent light-emitting module 1 can be obtained.

4. Variation

Subsequently, a variation of the embodiment will be described. A fluorescent light-emitting module according to the variation differs from those according to the embodiment in that the phosphor wheel is of a reflective type. Hereinafter, the description will focus on the differences from the embodiment, and the description of the common points will be omitted or simplified.

Figure 8:
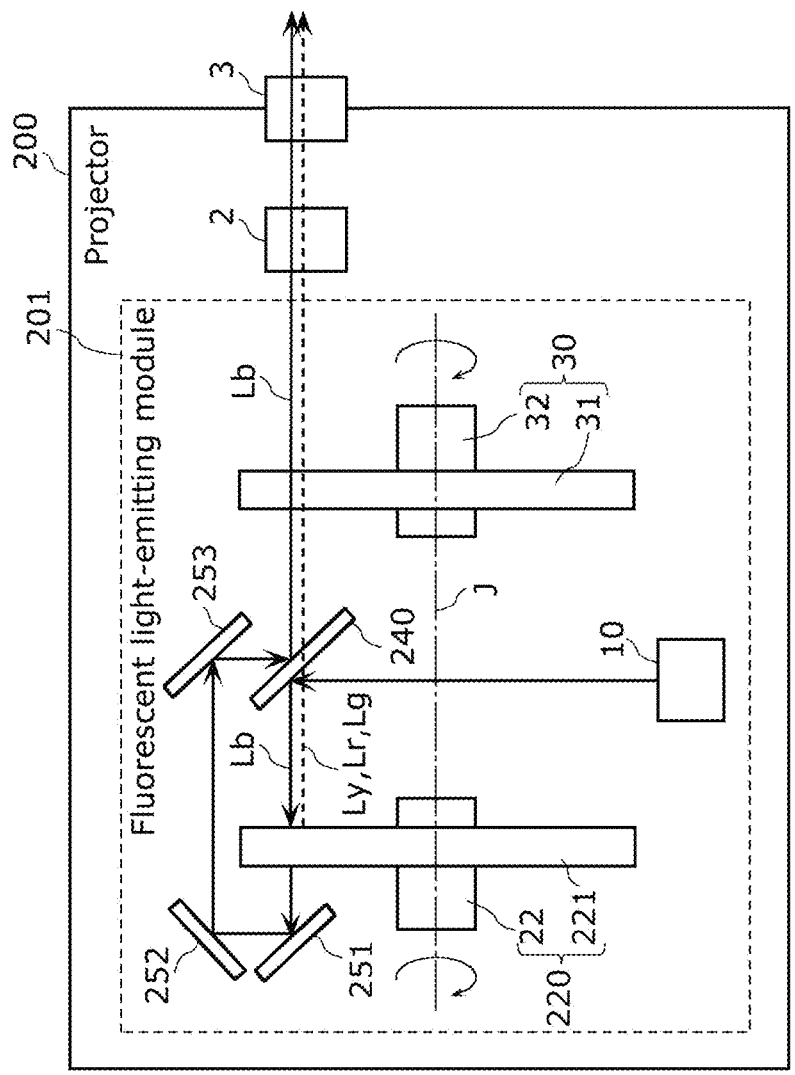
FIG. 8 is a schematic diagram showing a configuration of a projector according to a variation of the embodiment.

FIG. 8 is a schematic diagram showing a configuration of projector 200 according to the present variation. Projector 200 shown in FIG. 8 includes fluorescent light-emitting module 201 instead of fluorescent light-emitting module 1, as compared to projector 100 shown in FIG. 1.

Fluorescent light-emitting module 201 includes light source 10, phosphor wheel 220, color wheel 30, dichroic mirror 240, and reflective mirrors 251, 252, and 253. Phosphor wheel 220 is of the reflective type, and reflects incident excitation light (blue light Lb), as shown in FIG. 8.

Figure 9:
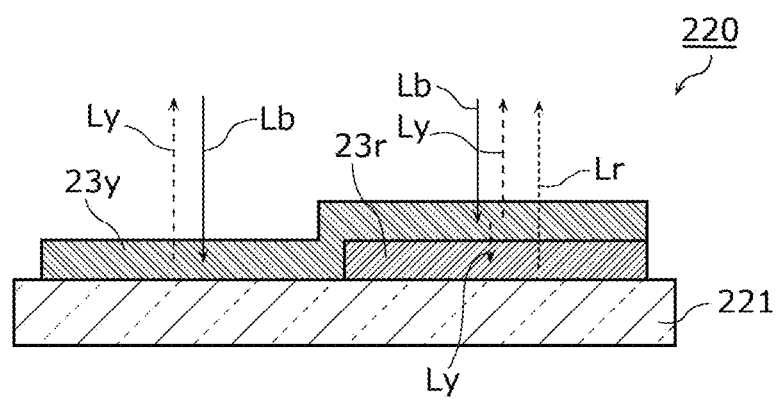
FIG. 9 is a cross sectional view of a phosphor wheel according to the variation of the embodiment.

FIG. 9 is a cross sectional view of phosphor wheel 220 according to the present variation. The cross section shown in FIG. 9 corresponds to the cross section taken along the line IV-IV in FIG. 3. It should be noted that a plane view of phosphor wheel 220 is the same as that for phosphor wheel 20 shown in FIG. 3.

As shown in FIG. 9, phosphor wheel 220 includes reflective substrate 221 instead of transparent substrate 21. Substrate 221 is, for example, a substrate made of metal such as aluminum. Alternatively, substrate 221 may include a transparent base material such as a glass substrate or a quartz substrate, and a metal layer provided on a surface of the base material.

In the present variation, red phosphor 23r is arranged between substrate 221 and yellow phosphor 23y. With this configuration, the excitation light (blue light Lb) is incident on yellow phosphor 23y before red phosphor 23r, so that yellow light Ly can be efficiently generated. The conversion efficiency into yellow light Ly is improved, thereby also enhancing the conversion efficiency into red light Lr in red phosphor 23r. Accordingly, the light utility efficiency can be enhanced.

Similar to the embodiment, substrate 221 of phosphor wheel 220 is provided with transparent portion 24 that transmits blue light Lb. Transparent portion 24 is a through hole that penetrates substrate 221. Alternatively, transparent portion 24 may be a light transmitting member such as glass that is transparent to blue light Lb. The light transmitting member may have a diffusion function (surface irregularities, diffusion particles, and the like) for diffusing blue light Lb.

For example, dichroic mirror 240 reflects a part of blue light Lb, and transmits light in wavelength ranges other than that for blue, such as yellow light Ly, red light Lr, and green light Lg. With this configuration, blue light Lb emitted from light source 10 can be guided to phosphor wheel 220, and yellow light Ly, red light Lr, and green light Lg, which are generated in phosphor wheel 220 can be transmitted to be guided to color wheel 30.

Reflecting mirrors 251, 252, and 253 reflect blue light Lb passing through transparent portion 24 of phosphor wheel 220 in this order, and emit the reflected light toward dichroic mirror 240. Dichroic mirror 240 can reflect a part of blue light Lb incident from reflection mirror 253 and guide the reflected light to color wheel 30. With this configuration, the utilization efficiency of blue light Lb emitted by light source 10 can be enhanced. Although an example has been described in which the optical path of blue light Lb is formed using three reflecting mirrors 251, 252, and 253, the present variation is not limited to this example.

As described above, in fluorescent light-emitting module 201 according to the present variation, phosphor wheel 220 further includes substrate 221 that has light reflectivity with respect to the excitation light and supports yellow phosphor 23y. Red phosphor 23r is arranged between yellow phosphor 23y and substrate 221.

With this configuration, even when reflective phosphor wheel 220 is used, it is possible to enhance the light utilization efficiency as in the embodiment. Furthermore, color reproducibility can also be enhanced. Still furthermore, since heat generation can be prevented, reliability can be improved, and lifespan can be extended.

Others

Although a fluorescent light-emitting module, projector, and phosphor wheel, according to the present invention, have been described based on the embodiments described above, the present invention is not limited to the embodiments described above.

For example, phosphor wheel 20 or 220 may not include green phosphor 23g. Synthesized light of blue light Lb and yellow light Ly may be used as green light Lg.

Furthermore, phosphor wheel 20 or 220 may not include red phosphor 23r. Red phosphor 23r may be included in color wheel 30. Specifically, red phosphor 23r may be arranged on a surface of color filter 33r, on and from which light is incident and emitted.

For example, fluorescent light-emitting module 1 or 201 may include a third rotating wheel that rotates in synchronization with each of color wheel 30 and phosphor wheel 20 or 220. Red phosphor 23r may be placed in the third rotating wheel.

For example, red phosphor 23r may be arranged closer to light source 10 than yellow phosphor 23y.

For example, phosphor wheel 20 may not include substrate 21. Each phosphor itself may be rigidly solidified and function as a substrate. Similarly, color wheel 30 may not include substrate 31.

Although an example has been described in which the first phosphor is a yellow phosphor and the second phosphor is a red phosphor, for example, the present invention is not limited to the example. For example, the first phosphor may be a green phosphor and the second phosphor may be the red phosphor. In such a case, the second phosphor may receive the green light as the excitation light and emit the red light as fluorescence.

Further, the second phosphor may emit visible light other than the red light. Although the above embodiment has been described using an example in which brightness of the red light is insufficient, the brightness of other light may be insufficient depending on the specifications of a projector. A type of each of the first phosphor and the second phosphor may be adjusted as required.

For example, fluorescent light-emitting module 1 or 201 may be used as a light source of a display device capable of displaying RGB colors.

In addition, forms obtained by applying, to each embodiment, various variations that those skilled in the art are conceivable, or forms obtained by optionally combining structural components and functions of each embodiment without departing from the spirit of the present invention are included in the present invention.

The invention claimed is:

1. A fluorescent light-emitting module comprising:
   a light source;
   a first rotating wheel including: a first phosphor that is configured to emit a first fluorescence when excited by excitation light emitted by the light source and a second phosphor that is configured to emit a second fluorescence when excited by a part of the first fluorescence;
   a second rotating wheel including a color filter that is configured to trim the first fluorescence to desired color light by cutting a part of the first fluorescence; and
   wherein
   the second phosphor is stacked on the first phosphor, and
   in a plan view of the first rotating wheel, a size of a portion of the first phosphor on which the second phosphor is not stacked is larger than a size of a portion of the first phosphor on which the second phosphor is stacked.

2. The fluorescent light-emitting module according to claim 1, wherein the color filter transmits at least a part of the second fluorescence.

3. The fluorescent light-emitting module according to claim 1, wherein
   the first phosphor is a yellow phosphor that emits yellow light as the first fluorescence, and
   the second phosphor is a red phosphor that emits red light as the second fluorescence.

4. The fluorescent light-emitting module according to claim 1, wherein the light source, the first phosphor, the second phosphor, and the color filter are arranged in stated order along an optical path of the excitation light.

5. The fluorescent light-emitting module according to claim 1, wherein
   the first rotating wheel further includes a support substrate that has light reflectivity with respect to the excitation light and supports the first phosphor, and
   the second phosphor is provided between the first phosphor and the support substrate.

6. The fluorescent light-emitting module according to claim 1, wherein the second phosphor is represented by a chemical formula of $La_3(Si,Al)_6(N,O)_{11}$.

7. A projector comprising:
   the fluorescent light-emitting module according to claim 1.

8. A phosphor wheel comprising:
   a first phosphor that is configured to emit first fluorescence when excited by excitation light emitted by a light source; and
   a second phosphor that is stacked on the first phosphor and is configured to emit second fluorescence when excited by a part of the first fluorescence,
   wherein
   in a plan view of the phosphor wheel, a size of a portion of the first phosphor on which the second phosphor is not stacked is larger than a size of a portion of the first phosphor on which the second phosphor is stacked.

* * * * *